US012696156B2

(12) United States Patent
Esswie

(10) Patent No.: US 12,696,156 B2
(45) Date of Patent: Jul. 28, 2026

(54) MULTI-HOP SIDELINK DOWNLINK DATA LOSS RECOVERY

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 382 days.

(21) Appl. No.: 18/448,886

(22) Filed: Aug. 11, 2023

(65) Prior Publication Data

US 2025/0056349 A1    Feb. 13, 2025

(51) Int. Cl.
| *H04W 36/08* | (2009.01) |
| *H04W 36/22* | (2009.01) |
| *H04W 36/30* | (2009.01) |

(52) U.S. Cl.
CPC ........... *H04W 36/08* (2013.01); *H04W 36/22* (2013.01); *H04W 36/30* (2013.01)

(58) Field of Classification Search
CPC ..... H04W 36/08; H04W 36/22; H04W 36/30; H04W 36/033; H04W 88/04; H04W 76/23
USPC .................................. 370/331, 329; 455/423
See application file for complete search history.

(56) References Cited

U.S. PATENT DOCUMENTS

| 2014/0023008 A1* | 1/2014 | Ahn | H04W 76/14 |
| | | | 370/329 |
| 2014/0179330 A1* | 6/2014 | Du | H04W 36/302 |
| | | | 455/450 |

| 2015/0208283 A1* | 7/2015 | Yang | H04L 47/34 |
| | | | 370/331 |
| 2016/0295621 A1* | 10/2016 | Han | H04W 56/001 |
| 2016/0302119 A1* | 10/2016 | Chen | H04W 76/14 |

(Continued)

FOREIGN PATENT DOCUMENTS

| WO | 2021/195647 | 9/2021 |

OTHER PUBLICATIONS

International Search Report and Written Opinion for PCT Application No. PCT/US2023/036316 mailed Apr. 24, 2024, 15 pages.

(Continued)

*Primary Examiner* — Ricardo H Castaneyra
(74) *Attorney, Agent, or Firm* — Amin, Turocy & Watson, LLP

(57) ABSTRACT

A remote user equipment device may receive traffic payload from a source radio access network node, with which the remote user equipment has an established communication session, via a relay user equipment device of a sidelink path. The relay device may receive a path switch request, which may be triggered by degraded communication channel conditions between the remote device and the source node or the relay device. The path switch request may indicate a target node with which the remote device is to establish a communication session. Responsive to the switch request, the relay device may transmit to the source node a pending sidelink traffic indication indicative of traffic payload packets undelivered by the relay device to the remote device. The source node may transmit information indicative of the undelivered packets to the target node to facilitate the target node transmitting the undelivered packets to the remote device.

20 Claims, 13 Drawing Sheets

(56) References Cited

U.S. PATENT DOCUMENTS

| | | | | |
|---|---|---|---|---|
| 2016/0338094 A1* | 11/2016 | Faurie | ................... | H04W 88/04 |
| 2019/0289520 A1* | 9/2019 | Xu | ...................... | H04W 36/033 |
| 2024/0413936 A1* | 12/2024 | Cheng | .................... | H04L 1/189 |
| 2025/0106675 A1* | 3/2025 | Kang | ................... | H04W 72/25 |

OTHER PUBLICATIONS

Intel Corporation: "Service continuity enhancements for L2 U2N relay" 3GPP Draft; R2-2209584, RAN WG2, Electronic meeting; Oct. 2022, [https://ftp.3gpp.org/tsg_ran/WG2_RL2/T SGR2_119bis-e/Docs/R2-2209584.zip R2-2209584—Service continuity enhancements for L2 U2N relaying.docx ] 14 pages.
Huawei: "RAN3 Text Proposal for FeD2D", 3GPP Draft; R3-171960, RAN WG3, Hangzhou, China; May 2017, [http://www .. 3gpp.org/ftp/tsg_ran/WG3_lu /TSGR3_96/Docs/ ] 12 pages.
Notification Concerning Transmittal of International Preliminary Report on Patentability for PCT Application No. PCT/US2023/036316 mailed Feb. 26, 2026, 8 pages.
European Office Action mailed Mar. 18, 2026 for European Patent Application No. 23817575.6, 3 pages.

\* cited by examiner

200

300

400

Figure 6:
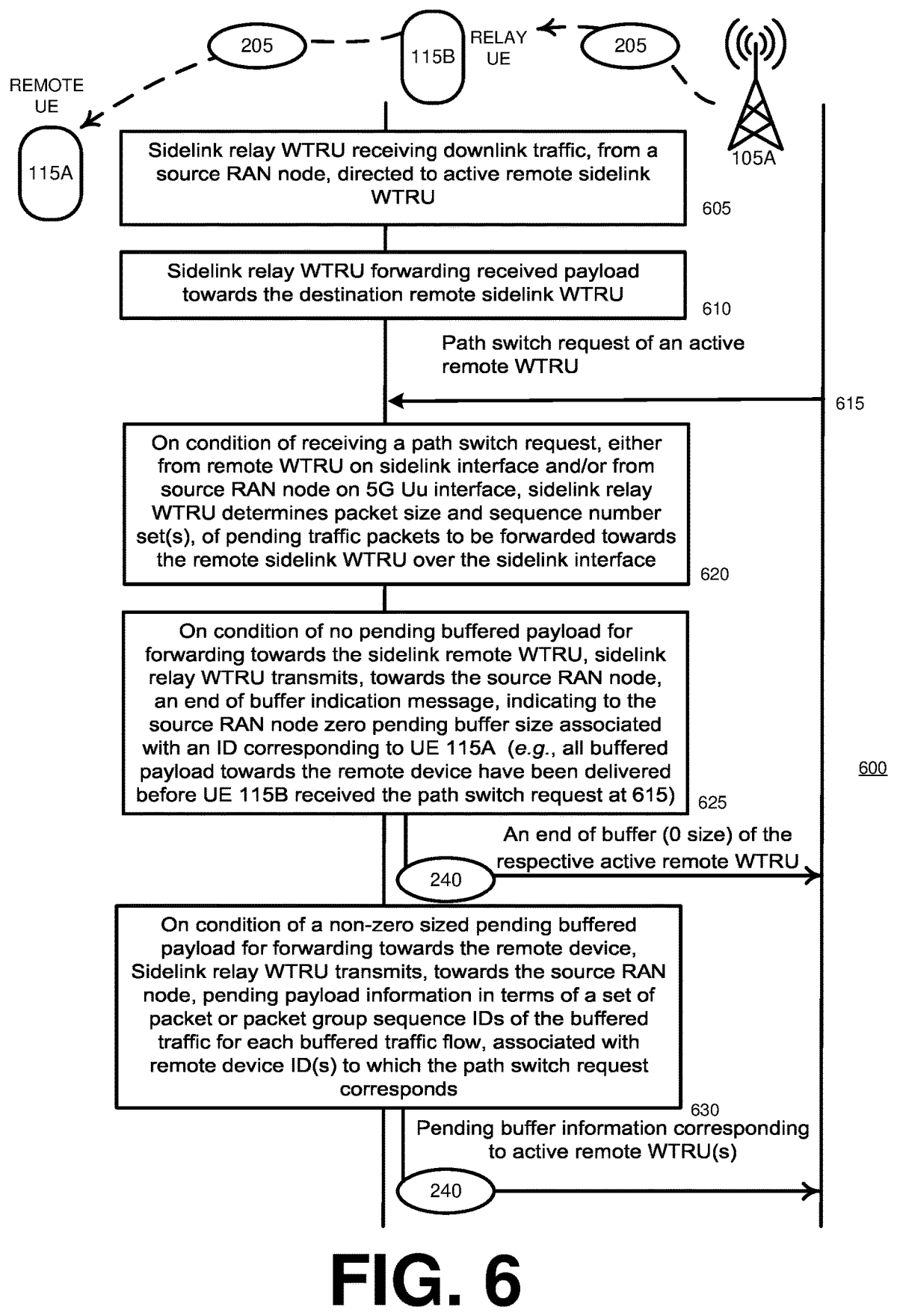

REMOTE
UE

RELAY
UE 205    115B    205

115A

105A

Sidelink relay WTRU receiving downlink traffic, from a
source RAN node, directed to active remote sidelink
WTRU

605

Sidelink relay WTRU forwarding received payload
towards the destination remote sidelink WTRU

610

Path switch request of an active
remote WTRU

615

On condition of receiving a path switch request, either
from remote WTRU on sidelink interface and/or from
source RAN node on 5G Uu interface, sidelink relay
WTRU determines packet size and sequence number
set(s), of pending traffic packets to be forwarded towards
the remote sidelink WTRU over the sidelink interface

620

On condition of no pending buffered payload for
forwarding towards the sidelink remote WTRU, sidelink
relay WTRU transmits, towards the source RAN node,
an end of buffer indication message, indicating to the
source RAN node zero pending buffer size associated
with an ID corresponding to UE 115A (e.g., all buffered
payload towards the remote device have been delivered
before UE 115B received the path switch request at 615)

625

An end of buffer (0 size) of the
respective active remote WTRU

240

600

On condition of a non-zero sized pending buffered
payload for forwarding towards the remote device,
Sidelink relay WTRU transmits, towards the source RAN
node, pending payload information in terms of a set of
packet or packet group sequence IDs of the buffered
traffic for each buffered traffic flow, associated with
remote device ID(s) to which the path switch request
corresponds

630

Pending buffer information corresponding
to active remote WTRU(s)

Figure 8:
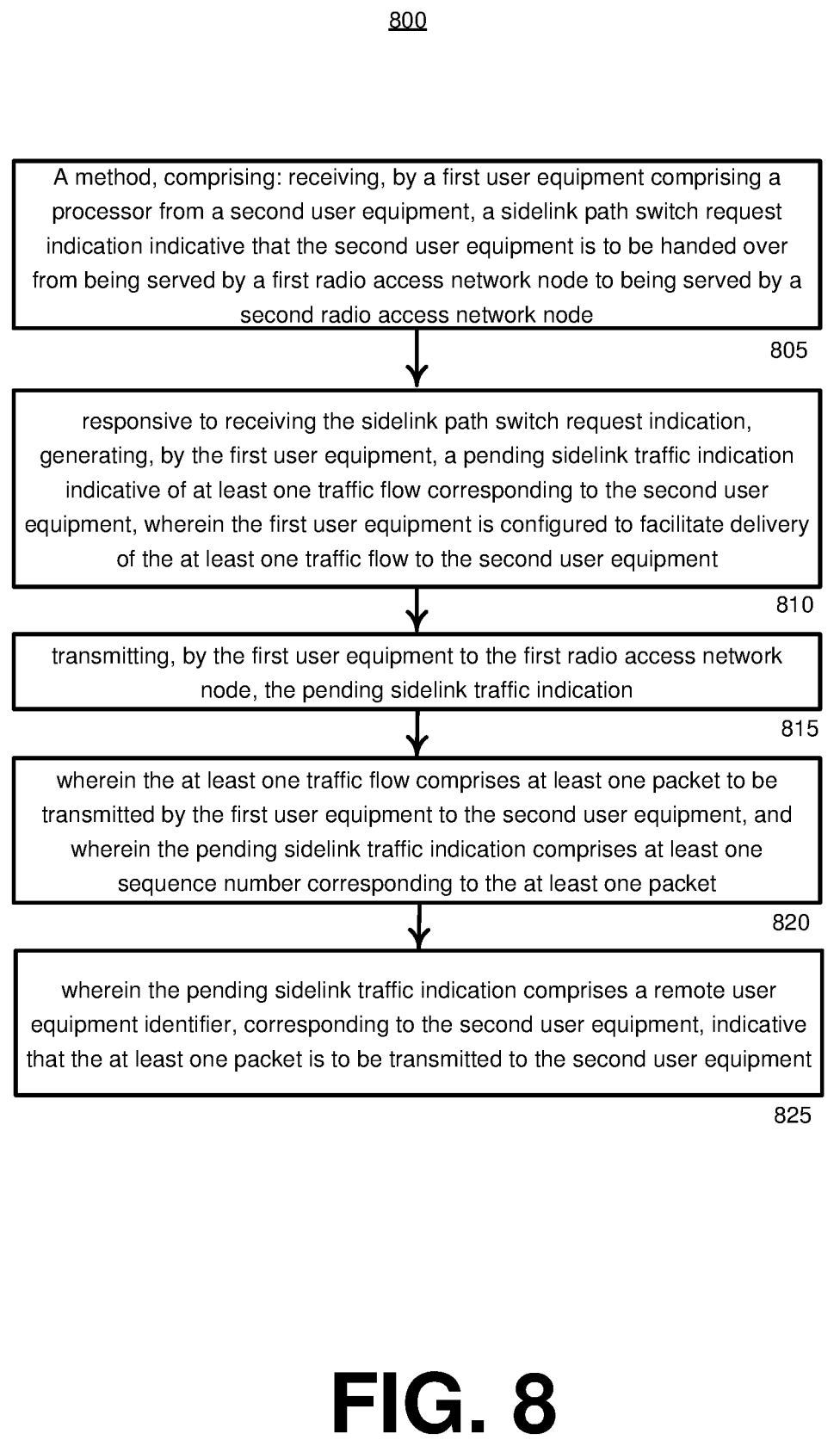

A method, comprising: receiving, by a first user equipment comprising a processor from a second user equipment, a sidelink path switch request indication indicative that the second user equipment is to be handed over from being served by a first radio access network node to being served by a second radio access network node

805 responsive to receiving the sidelink path switch request indication, generating, by the first user equipment, a pending sidelink traffic indication indicative of at least one traffic flow corresponding to the second user equipment, wherein the first user equipment is configured to facilitate delivery of the at least one traffic flow to the second user equipment

810 transmitting, by the first user equipment to the first radio access network node, the pending sidelink traffic indication

815 wherein the at least one traffic flow comprises at least one packet to be transmitted by the first user equipment to the second user equipment, and wherein the pending sidelink traffic indication comprises at least one sequence number corresponding to the at least one packet

820 wherein the pending sidelink traffic indication comprises a remote user equipment identifier, corresponding to the second user equipment, indicative that the at least one packet is to be transmitted to the second user equipment

Figure 9:
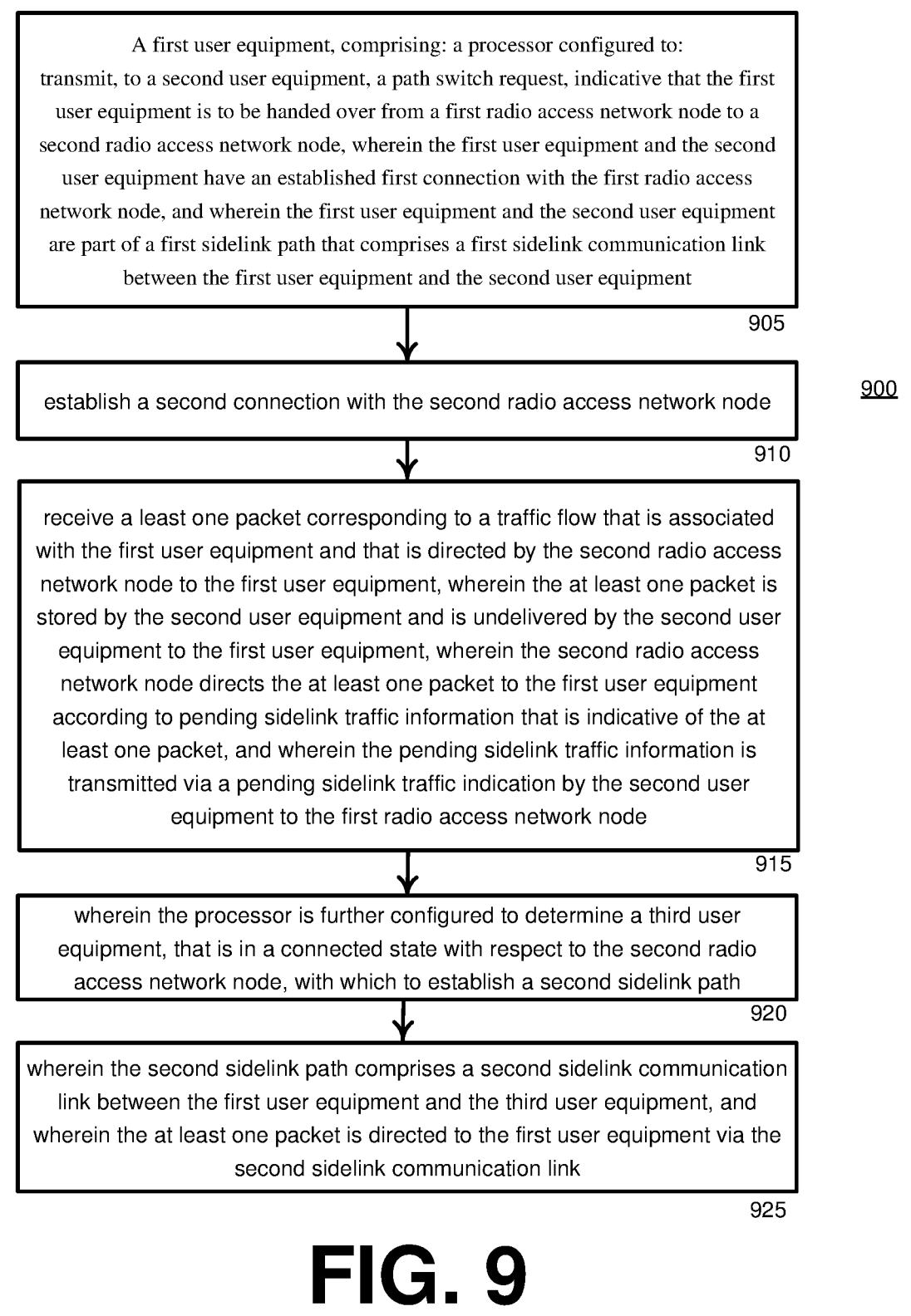

A first user equipment, comprising: a processor configured to: transmit, to a second user equipment, a path switch request, indicative that the first user equipment is to be handed over from a first radio access network node to a second radio access network node, wherein the first user equipment and the second user equipment have an established first connection with the first radio access network node, and wherein the first user equipment and the second user equipment are part of a first sidelink path that comprises a first sidelink communication link between the first user equipment and the second user equipment

905

900 establish a second connection with the second radio access network node

910 receive a least one packet corresponding to a traffic flow that is associated with the first user equipment and that is directed by the second radio access network node to the first user equipment, wherein the at least one packet is stored by the second user equipment and is undelivered by the second user equipment to the first user equipment, wherein the second radio access network node directs the at least one packet to the first user equipment according to pending sidelink traffic information that is indicative of the at least one packet, and wherein the pending sidelink traffic information is transmitted via a pending sidelink traffic indication by the second user equipment to the first radio access network node

915 wherein the processor is further configured to determine a third user equipment, that is in a connected state with respect to the second radio access network node, with which to establish a second sidelink path

920 wherein the second sidelink path comprises a second sidelink communication link between the first user equipment and the third user equipment, and wherein the at least one packet is directed to the first user equipment via the second sidelink communication link

Figure 10:
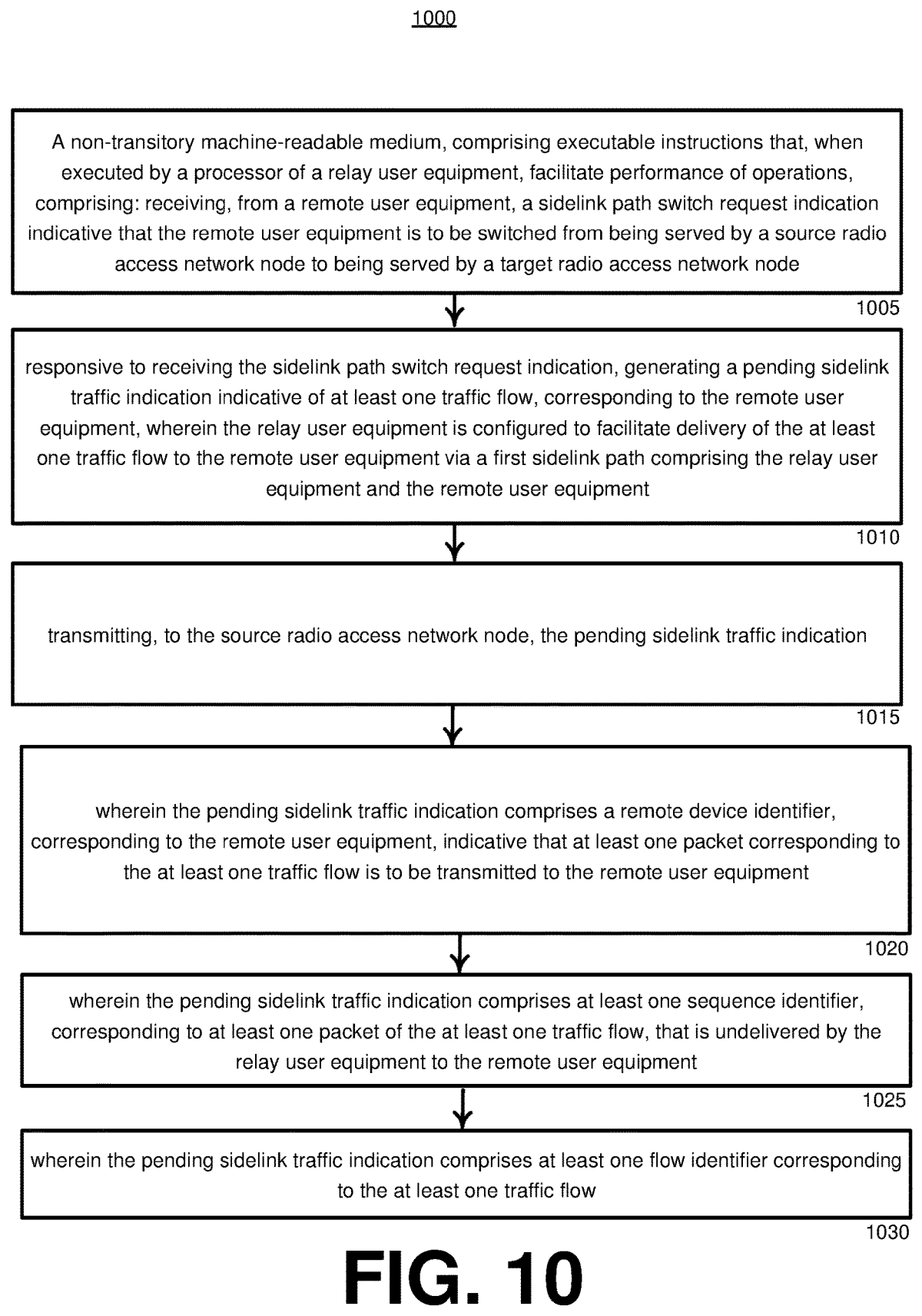

A non-transitory machine-readable medium, comprising executable instructions that, when executed by a processor of a relay user equipment, facilitate performance of operations, comprising: receiving, from a remote user equipment, a sidelink path switch request indication indicative that the remote user equipment is to be switched from being served by a source radio access network node to being served by a target radio access network node

1005 responsive to receiving the sidelink path switch request indication, generating a pending sidelink traffic indication indicative of at least one traffic flow, corresponding to the remote user equipment, wherein the relay user equipment is configured to facilitate delivery of the at least one traffic flow to the remote user equipment via a first sidelink path comprising the relay user equipment and the remote user equipment

1010 transmitting, to the source radio access network node, the pending sidelink traffic indication

1015 wherein the pending sidelink traffic indication comprises a remote device identifier, corresponding to the remote user equipment, indicative that at least one packet corresponding to the at least one traffic flow is to be transmitted to the remote user equipment

1020 wherein the pending sidelink traffic indication comprises at least one sequence identifier, corresponding to at least one packet of the at least one traffic flow, that is undelivered by the relay user equipment to the remote user equipment

1025 wherein the pending sidelink traffic indication comprises at least one flow identifier corresponding to the at least one traffic flow

MULTI-HOP SIDELINK DOWNLINK DATA LOSS RECOVERY

BACKGROUND

The 'New Radio' (NR) terminology that is associated with fifth generation mobile wireless communication systems ("5G") refers to technical aspects used in wireless radio access networks ("RAN") that comprise several quality of service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance and delivery of traffic, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

Sidelink communications may facilitate a variety of cellular use-cases such as autonomous vehicle crash avoidance, public avoidance, coordinated vehicle cruise control, and the like, where devices become able to communicate and coordinate directly with each other without communication messaging and signaling going through the RAN network. This is particularly important in cases where some of or all user equipment that coordinate as part of a sidelink group are located beyond RAN wireless coverage. In scenarios where user equipment are beyond RAN coverage, RAN nodes may control how sidelink resources are dynamically reserved and released for each device to prevent more than one user equipment of a sidelink group transmitting simultaneously on partially or fully overlapping sidelink resource to avoid transmission collision.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by a first user equipment comprising a processor from a second user equipment, a sidelink path switch request indication indicative that the second user equipment is to be handed over from being served by a first radio access network node to being served by a second radio access network node. The method may further comprise, responsive to receiving the sidelink path switch request indication, generating, by the first user equipment, a pending sidelink traffic indication indicative of at least one traffic flow corresponding to the second user equipment, wherein the first user equipment is configured to facilitate delivery of the at least one traffic flow to the second user equipment. The method may further comprise transmitting, by the first user equipment to the first radio access network node, the pending sidelink traffic indication.

In an embodiment, the first user equipment and the second user equipment may compose, be part of, or make up, a sidelink communication path. The first user equipment and the second user equipment may be in a connected state with respect to the first radio access network node. In an embodiment, the first user equipment may be a relay user equipment of the sidelink path and the second user equipment may be a remote user equipment of the sidelink path.

In an embodiment, the at least one traffic flow may comprise at least one packet to be transmitted by the first user equipment to the second user equipment, and the pending sidelink traffic indication may comprise at least one sequence number corresponding to the at least one packet.

In an embodiment, the first user equipment and the second user equipment may be configured to communicate as part of a sidelink communication path via a sidelink communication link, wherein the sidelink communication link becomes a degraded sidelink communication link that is unable to facilitate communication between the first user equipment and the second user equipment, and wherein the first user equipment is unable to transmit the at least one packet to the second user equipment via the degraded sidelink communication link. Being unable to facilitate communication via the degraded sidelink communication link may comprise being unable to facilitate communication of the at least one packet within a configured latency requirement or according to another packet transmission performance criterion.

In an embodiment, the pending sidelink traffic indication may comprise a remote user equipment identifier, corresponding to the second user equipment, indicative that the at least one packet is to be transmitted to the second user equipment. In an embodiment, the pending sidelink traffic indication may comprise a flow identifier corresponding to the at least one traffic flow associated with the second user equipment.

In an embodiment, the at least one traffic flow may comprise at least one packet. The pending sidelink traffic indication may comprise a null indication indicative that the at least one packet has been transmitted, by the first user equipment, to the second user equipment.

In an embodiment, the pending sidelink traffic indication may be transmitted via an uplink control information message.

In an embodiment, the pending sidelink traffic indication may be indicative of the at least one traffic flow comprising multiple traffic flows corresponding to the second user equipment. The pending sidelink traffic indication comprises at least one null indication indicative that at least one packet, corresponding to at least one of the multiple traffic flows, that has been received by the first user equipment for transmission to the second user equipment via a sidelink communication path has been transmitted to the second user equipment via the sidelink communication path.

In another embodiment, a first user equipment may comprise a processor configured to transmit, to a second user equipment, a path switch request, indicative that the first user equipment is to be handed over from a first radio access network node to a second radio access network node. The first user equipment and the second user equipment may have an established first connection with the first radio access network node. The first user equipment and the second user equipment may be part of a first sidelink path that comprises a first sidelink communication link between the first user equipment and the second user equipment. The processor may be further configured to establish a second connection with the second radio access network node. The processor may be further configured to receive at least one packet corresponding to a traffic flow that is associated with the first user equipment and that is directed by the second radio access network node to the first user equipment. The at least one packet may be stored by the second user equipment and may be undelivered by the second user equipment to the first user equipment. The second radio access network node may direct the at least one packet to the first user equipment according to pending sidelink traffic information that is indicative of the at least one packet. The pending sidelink traffic information may be transmitted via a pending sidelink traffic indication by the second user equipment to the first radio access network node.

In an embodiment, the processor may be further configured to determine a third user equipment, that is in a connected state with respect to the second radio access network node, with which to establish a second sidelink path. The second sidelink path may comprise a second sidelink communication link between the first user equipment and the third user equipment. The at least one packet may be directed to the first user equipment via the second sidelink communication link.

In an embodiment, the processor may be further configured to determine a first signal strength corresponding to the first radio access network node to result in a determined first signal strength and determine a second signal strength corresponding to the second radio access network node to result in a determined second signal strength. The processor may be further configured to analyze the determined first signal strength and the determined second signal strength with respect to a signal strength criterion to result in a first analyzed signal strength and a second analyzed signal strength, respectively, and to determine the path switch request based on the first analyzed signal strength failing to satisfy the signal strength criterion and the second analyzed signal strength satisfying the signal strength criterion. The second user equipment may transmit the pending sidelink traffic information to the first radio access network node in response to receiving the path switch request.

In an embodiment, the pending sidelink traffic indication may comprise a user equipment identifier corresponding to the first user equipment and a flow identifier corresponding to the traffic flow.

In yet another embodiment, a non-transitory machine-readable medium may comprise executable instructions that, when executed by a processor of a relay user equipment, facilitate performance of operations, comprising receiving, from a remote user equipment, a sidelink path switch request indication indicative that the remote user equipment is to be switched from being served by a source radio access network node to being served by a target radio access network node. The operations may further comprise, responsive to receiving the sidelink path switch request indication, generating a pending sidelink traffic indication indicative of at least one traffic flow, corresponding to the remote user equipment, wherein the relay user equipment is configured to facilitate delivery of the at least one traffic flow to the remote user equipment via a first sidelink path comprising the relay user equipment and the remote user equipment and transmitting, to the source radio access network node, the pending sidelink traffic indication.

In an embodiment, the pending sidelink traffic indication may comprise a remote device identifier, corresponding to the remote user equipment, indicative that at least one packet corresponding to the at least one traffic flow is to be transmitted to the remote user equipment. In an embodiment, the pending sidelink traffic indication may comprise at least one sequence identifier, corresponding to at least one packet of the at least one traffic flow, that is undelivered by the relay user equipment to the remote user equipment. In an embodiment, the pending sidelink traffic indication may comprise at least one flow identifier corresponding to the at least one traffic flow. In an embodiment, the at least one traffic flow may comprise at least one packet. The pending sidelink traffic indication may comprise a null indication indicative that the at least one packet has been transmitted, by the relay user equipment, to the remote user equipment.

BRIEF DESCRIPTION OF THE DRAWINGS

FIG. 6 illustrates a timing diagram of an example method to notify a source radio access network node of packets undelivered to a remote user equipment that is being handed over to a target radio access network node.

FIG. 8 illustrates a block diagram of an example method.

FIG. 9 illustrates a block diagram of an example user equipment.

FIG. 10 illustrates a block diagram of an example non-transitory machine-readable medium embodiment.

DETAILED DESCRIPTION OF THE DRAWINGS

Figure 1:
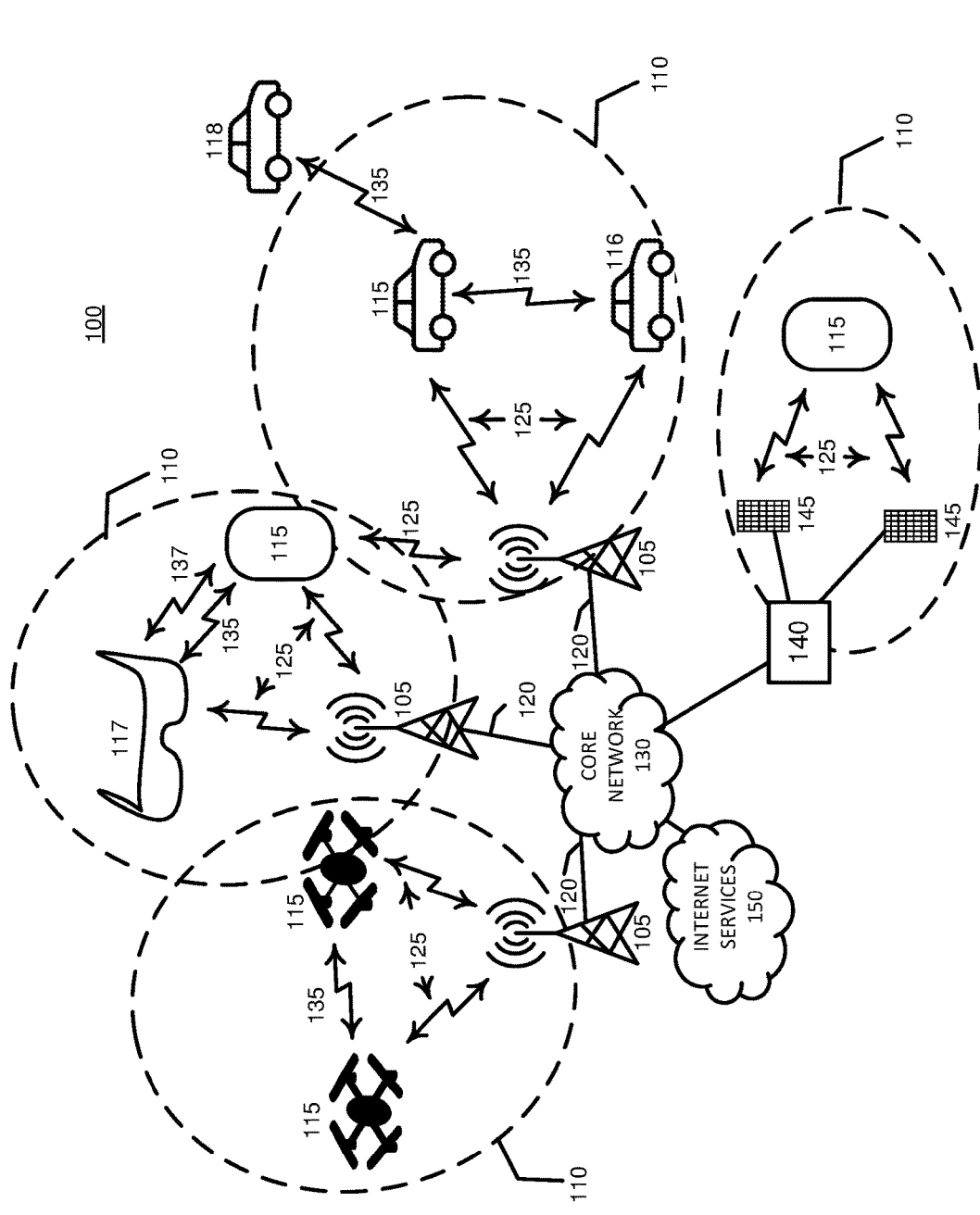
FIG. 1 illustrates a wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. In yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Sidelink Communications

Sidelink communications refers to cellular devices communicating with each other directly, without having to go through a serving RAN node, by establishing a sidelink communication link. However, a RAN node may or may not control how sidelink resources are being reserved and dictated by different sidelink devices. In one sidelink radio resource management option, sidelink devices are configured to always request a sidelink resource towards another sidelink device from the serving RAN node. This requires that at least, the transmitting sidelink node to be within the coverage of the serving node. Furthermore, the sidelink-experienced communication latency clearly increases due to the additional transmission of the RAN scheduling request and reception of the corresponding scheduling grant before the sidelink scheduling and transmission are triggered. Advantageously, this reduces the possibility of sidelink channel collisions.

In another radio resource management option, sidelink devices are configured to autonomously sense the sidelink channel resources, determine which sidelink resource are reserved for other devices' sidelink transmissions, and determine which resource set is free/available for their own transmission. The channel sensing rules and high-level channel sensing configurations are indicated from the RAN network. Therefore, the sidelink control channel has been designed to support efficient channel sensing over the sidelink interface. In particular, the sidelink control channel is designed in a two-stage format. The first stage carries a first stage sidelink control information ("SCI"), and the second stage carries a second stage SCI.

The first stage SCI is similar to the RAN downlink control information ("DCI") and may carry the following information elements: scheduling information of a reserved data resource for a sidelink transmission of interest, and scheduling resource information of the second stage SCI that carries the transmission-specific configuration of the sidelink data channels.

Accordingly, sidelink devices attempt blindly decoding of the first stage SCI to determine which sidelink data resource will be reserved by which sidelink device in proximity. However, the sensing sidelink device cannot determine whether an actual sidelink data payload is destined for it, thus a sidelink device decodes the second stage SCI. The second stage SCI carries the following information elements: source device and destination device identifiers of the sidelink transmission, and sidelink transmission configurations including modulation schemes, coding schemes, and HARQ feedback information.

Therefore, a sidelink device monitors and blindly decodes the first stage SCI to determine the reserved channel resources for the associated sidelink transmission, determines transmission configurations of the second stage SCI, and decodes the second stage SCI to determine if a corresponding sidelink transmission is destined for it. If a sidelink device is a transmit-only device (e.g., an M2M device), the device need only receive and blindly decode the first stage SCI, while skipping decoding of the second stage SCI, in which case channel sensing may only comprise monitoring, detection, and blind decoding of the first stage SCI.

There are two modes of channel sensing. First, continuous channel sensing may be configured such that a control channel of the sidelink interface signaling can flexibly be placed at any time instant such that a sensing sidelink device needs to always search and monitor for a control channel that is carrying the first stage SCI. Second, and due to the significant power consumption burden of the continuous sensing, a partial channel sensing procedure may be implemented, such that the sidelink control channel is configured to be periodically, or non-periodically, transmitted during predefined time instants, or occasions, and accordingly, sensing sidelink device need only monitor and blindly decode those timing and frequency instants while possibly deep sleeping otherwise.

Sidelink relays are sidelink user equipment devices that perform sidelink and RAN functions on behalf of, or for the sake of, other remote sidelink devices in proximity to the sidelink relay. A multi-hop sidelink path, or sidelink route, from a source user equipment to a destination user equipment may comprise multiple sidelink relay user equipment devices. Sidelink relays offer a wide set of sidelink functionality for remote, or destination, sidelink devices including channel granting, multi-hop traffic relaying, or paging monitoring. Thus, less capable sidelink remote devices obtain several performance advantages such as power saving gains, and sidelink and RAN network coverage extension. Two modes may be used by a sidelink relay device to announce presence with respect to other sidelink user equipment in proximity. In one variant, sidelink relays explicitly announce their presence using a preconfigured discovery procedure. During the configured discovery period, sidelink relay broadcasts an announcement message that indicates their presence and their associated relaying configurations. Remote/destination devices receive a relay's discovery messages and, upon interest in becoming part of, or a member of, a sidelink zone, or group, that includes the relay, initiate a direct communication link with the sidelink relay.

In another discovery variant, a sidelink remote device proactively transmits a discovery message requesting that sidelink relays in proximity announce their presence and corresponding relaying services. This option offers the advantage of the on-demand discovery signaling where sidelink relays avoid transmitting unnecessary discovery messages that may not be utilized by present remote devices in proximity.

Layer-2 relaying denotes that the end-to-end protocol stack and QoS targets over a sidelink interface will not be interrupted at the relay, e.g., the relay alters lower layer headers to perform traffic relaying. Thus, with layer-2 relays, the end-to-end QoS and flows can be tracked and maintained. However, for layer-3 relaying, the end-to-end QoS is lost at the relay side because the latter alters and translates the original QoS flows metrics to corresponding relay-specific metrics.

Baseline channel allocation procedures corresponding to a sidelink interface are typically dynamic and may depend on either RAN network configurations or sidelink device sensing and resource selection. It may be desirable to utilize limited sidelink resources only when there is sidelink traffic to maximize sidelink spectral efficiency. However, sidelink use may comprise various sidelink device capabilities, sidelink transmission periodicities, and sidelink QoS targets. For example, for sidelink devices that are able to sense a sidelink channel, the reliability of the sidelink interface can be enhanced by using sidelink resources the devices sense as idle. However, for sensing-non-capable sidelink devices, random selection of sidelink channel resources for facilitating sidelink transmission may jeopardize reliability of concurrent sidelink transmission-critical traffic when a resource collision occurs.

Accordingly, sidelink channel preemption procedures may be used to enable sidelink devices with traffic to be transmit that is higher priority than traffic to be transmitted by other sidelink devices to attach or append a higher priority traffic indication, that may be a first stage SCI, to facilitate selecting and 'taking over' sidelink resources that may have been assigned for transmission of the lower priority traffic. Thus, user equipment corresponding to higher priority critical traffic can immediately takeover occupied sidelink channel resources and achieve an optimized sidelink transmission latency. User equipment corresponding to lower priority traffic, upon detecting the higher priority traffic indication in the first stage SCI, may stop and/or halt ongoing sidelink transmission over resources scheduled according to the first stage SCI such that a collision is avoided. Although facilitating transmission of higher priority traffic, sidelink channel preemption may result in several drawbacks, including sidelink device with lower priority traffic must be sensing-capable devices, otherwise, they may not detect the higher priority preemption indication, and accordingly, may continue sidelink transmissions over resources scheduled for the user equipment corresponding to the higher priority traffic thus causing a collision, and degrading sidelink latency and reliability. In addition, sidelink channel preemption may not differentiate user equipment corresponding to higher priority traffic on the basis of real time QoS performance. For example, user equipment corresponding to higher priority traffic may transmit the same higher priority traffic preemption indication regardless of which device with high priority traffic may be about to violate a QoS target first, and thus should be prioritized with respect to other devices in proximity.

Accordingly, it is desirable to optimize latency performance and reliability of the sidelink communications when channel-sensing-capable and channel-sensing-non-capable sidelink devices coexist with each other on the same sidelink spectrum. In such deployments, existing sidelink channel allocation and prioritization procedures do not guarantee fast and reliable sidelink transmissions due to the key assumption that sidelink devices in proximity must be able to sense the sidelink channel allocation messages fully or partially, which is not applicable in many sidelink deployments. Thus, solutions for improving sidelink channel reliability and latency in multi-device multi-capability sidelink deployments are desirable.

Turning now to the figures, FIG. 1 illustrates an example of a wireless communication system 100 that supports blind decoding of PDCCH candidates or search spaces in accordance with one or more example embodiments of the present disclosure. The wireless communication system 100 may include one or more base stations 105, one or more user equipment ("UE") devices 115, and core network 130. In some examples, the wireless communication system 100 may comprise a long-range wireless communication network, that comprises, for example, a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system band-width" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHZ)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications, such as sidelink communication, may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both. In FIG. 1, vehicle UE 116 is shown inside a RAN coverage area and vehicle UE 118 is shown outside the coverage area of the same RAN. Vehicle UE 115 wirelessly connected to the RAN may be a sidelink relay to in-RAN-coverage-range vehicle UE 116 or to out-of-RAN-coverage-range vehicle UE 118.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

It is desirable for mobility management of sidelink relay deployments, where an intermediate sidelink relay device relays downlink traffic from a source RAN node towards connected remote sidelink device, to be as seamless as possible. When a remote device is handed over from being served by a source radio access network node to being served by a target radio access network node, according to conventional techniques the target RAN node may operate based on an assumption that packets transmitted from a source RAN node (e.g., a radio access network node that is serving a remote UE before the remote UE is handed over to being served by a target RAN node) to a relay UE of a sidelink path are successfully received by the remote device. Thus, according to conventional techniques, a target RAN node may only transmit packets of a traffic flow that were not transmitted by the source RAN node that was previously serving the remote UE to a relay UE that was facilitating delivery of the traffic flow to the remote UE as part of a sidelink path. However, when one or more previously transmitted packets (e.g., previously transmitted from source RAN node to the relay UE) are still pending for forwarding at the intermediate sidelink relay UE, for example due to remote device mobility, the remote device may lose sidelink connectivity with sidelink relay UE and thus the pending packets that may be buffered at the sidelink relay may be lost, or undelivered. The undelivered packets may not be re-transmitted by the target RAN node after the remote UE has been handed over to the target RAN due to the target RAN not being aware of the pending packets buffered by the previous intermediate sidelink relay user equipment.

According to techniques disclosed herein, a sidelink relay user equipment may notify a source RAN node (e.g., a radio access network node from which a remote user equipment is handed over) with pending traffic information (e.g., packet sequence numbers of packet group numbers) corresponding to traffic that may be directed to a remote user equipment, which may be handed over to a target RAN node while the traffic is still pending at the relay user equipment (e.g., the packets have been transmitted to the relay UE by a source RAN and are buffered at the relay UE but have not been received by the remote UE).

Downlink Data Loss Recovery for Multi-Hop Sidelink

According to embodiments disclosed herein, a sidelink relay device may be receiving downlink traffic from a source RAN node, and correspondingly, relaying such traffic over a sidelink interface toward a certain connected remote sidelink device. The sidelink remote user equipment device may be moving away from a current relay and/or current source RAN node that is serving the remote user equipment. The movement/mobility of the remote user equipment may result in a controlled RAN handover of the remote user equipment from being served by the current source RAN node to being served by a target radio access network node, which may be referred to as a new source RAN node. The sidelink relay device may receive a path switching request indication/message, either from the source RAN node (indicating that subsequent payload arrivals towards the remote device are to be re-routed to the target RAN node instead), or from another sidelink relay which is connected towards the target RAN node. Upon receiving the path switching request message, the sidelink relay user equipment may determine, based on sidelink user equipment scheduling buffer(s) of the relay user equipment, a buffer size and one or more packet sequence number(s) or packet group number(s) of buffered packets corresponding to delivery of traffic flows directed to a remote user equipment being facilitated by the relay user equipment. Thus, the sidelink relay user equipment may compile a sidelink pending buffer report, which may be referred to as, or which may comprise, a pending sidelink traffic indication, corresponding to traffic to be forwarded by the relay user equipment to a remote user equipment. Accordingly, the relay user equipment may transmit a report of pending packets as an uplink control information message toward the source RAN node or to the target RAN node. The pending sidelink traffic indication may comprise pending traffic buffer information associated with a device identifier corresponding to a remote user equipment for which such traffic associated with the buffer information is directed. In an embodiment, buffer information reported in a pending sidelink traffic indication may indicate a NULL or an indication of zero sized pending buffer corresponding to a remote device indicated in the pending sidelink traffic indication in a scenario where traffic to be relayed to the indicated remote user equipment has been already delivered to the remote user equipment before a handover is initiated. In another embodiment, for a buffer at a relay user equipment having packets undelivered to a remote user equipment, a pending sidelink traffic indication may comprise information indicative of buffered packets, or indicative of packet group sequence numbers, associated with one or more traffic flows, for which forwarding via a sidelink radio interface to the remote user equipment is pending. The source RAN node may receive sidelink pending traffic buffer information in a pending sidelink traffic indication regarding one or more just-handed-over remote user equipment devices and may transfer packets indicated in a pending sidelink traffic indication (e.g., packets that are identified by sequence numbers inside the buffer report), towards a target RAN node to which the remote device has been handed over. The target/new source RAN node may re-transmit packets that were undelivered by the original/previous/old source RAN node either to a remote user equipment device or to a new intermediate sidelink relay user equipment that will be relaying traffic received from the target towards the remote device. Thus, flexible sidelink mobility may be achieved without data loss due to intermediate sidelink relaying functionality being taken over by a sidelink relay user equipment that is different that a previous sidelink relay user equipment.

Unlike conventional techniques, according to which a user equipment may report a buffer status report indicative only of a size of the user equipment's pending traffic directed to a RAN node to which the buffer report is transmitted (a purpose of a conventional buffer status report is for a RAN node to be made aware of a buffered traffic size, or amount, of traffic buffered by a user particular equipment, and to accordingly allocate an amount of resources to facilitate transmission of the buffered traffic by the particular user equipment), according to embodiments disclosed herein a sidelink relay user equipment may transmit buffer information corresponding to pending/buffered traffic associated with other user equipment, for example a remote user equipment of a sidelink chain, wherein such buffer information indicates sequence numbers of buffered packet(s) or packet group(s) (not just size), which may facilitate a new purpose of buffer information of a target RAN node re-transmitting indicated packets to a remote user equipment.

Figure 2:
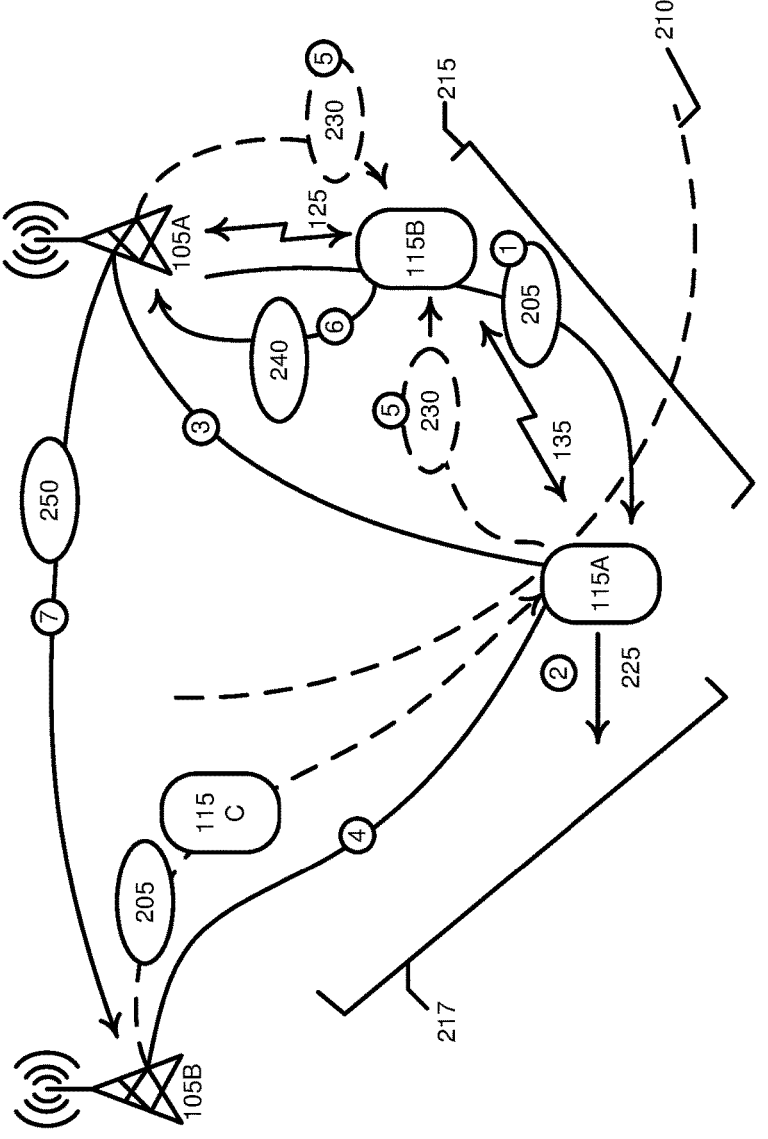
FIG. 2 illustrates an example environment with remote user equipment moving away from a source radio access network node.

Turning now to FIG. 2, the figure illustrates environment 200 comprising radio access network node 105A with traffic 205 to deliver to remote user equipment 115A at act 1. Sidelink relay UE 115B, which may have established a communications session, or a connected state, with source RAN node 105A, may be receiving downlink traffic, via long-range wireless link/RAN interface 125, for relaying towards a certain connected remote sidelink device 115A via the sidelink interface/sidelink link 135. The remote user equipment device 115A moving in direction 225 away from sidelink relay 115B or moving away from source RAN node 105A may trigger a controlled RAN handover of UE 115A towards target RAN node 105B. Sidelink relay user equipment device 115B may receive a path switch request 230, either from sidelink remote device 115A via sidelink interface 135 or from source RAN node 105A via long-range wireless RAN interface 125. Such path switching request may signal, or indicate to, sidelink relay device 115B that a current end-to-end connection corresponding to remote user equipment device 115A is about to be changed due to the remote user equipment being handed over to being served by adjacent target RAN node 105B. Accordingly, remote user equipment 115A may select another sidelink relay 115C, which may be connected to target RAN node 105B, for traffic relaying via a new sidelink path 217 comprising UE 115A and UE 115C. (Delivery of traffic 205 from target radio access network node 105B is shown in dashed lines to indicate that delivery of traffic 205 to user equipment 115A may not yet have begun via relay user equipment 115 C.)

If long-range wireless channel conditions of link 125 between radio access network node 105A and user equipment 115A are satisfactory, radio access network node 105A may transmit traffic 205 to relay user equipment 115B via long range wireless communication link 125. If, due to poor channel conditions between RAN 105A and UE 115A (e.g., UE 115A may be at an edge of a radio signal range 210 corresponding to radio access network node 105A), traffic 205 may be delivered via sidelink route/path 215. Sidelink path 215 may comprise remote user equipment 115A and relay user equipment 115B. Traffic 205 may be transmitted from relay user equipment 115B to remote user equipment 115A via side link communication links 135.

At act 2, user equipment 115A may move in direction 225 away from signal coverage range, or signal strength range, 210 corresponding to radio access network node 105A. At act 3, radio access network node 105 may determine that user equipment 115A should be handed over from being served by radio access network node 105A to being served by radio access network node 105B. The determination that remote user equipment 115A should be handed over from being served by source radio access network node 105A to target radio access network node 105*b* may be facilitated by relay user equipment 115B or by remote user equipment 115A. Accordingly, remote user equipment 115A may establish a communication connection, for example an RRC connected state communication session, with target radio access network node 105B at act 4. At act 5, relay user equipment 115B may receive a sidelink path switch request indication 230. Receiving of a sidelink path switch request indication 230 is shown in FIG. 2 with dashed lines to indicate that a sidelink path switch request indication may be generated by, and received from, relay user equipment 115A or radio access network node 105A.

At act 6, responsive to receiving sidelink path switch request indication 230, user equipment 115B may generate pending sidelink traffic indication 240 indicative of at least one traffic flow corresponding to user equipment 115A, wherein user equipment 115B may be configured to facilitate delivery of the at least one traffic flow to UE 115A, and UE 115B may transmit the pending sidelink traffic indication to source radio access network node 105A. Accordingly, radio access network node 105A may receive information in pending sidelink traffic indication 240 that indicates to radio access network node 105A one or more traffic packets of traffic 205 that may be buffered, or stored, at user equipment 115B that were to be transmitted to user equipment 115A via sidelink link 135, but were not delivered to user equipment 115A before handover of remote user equipment 115A to being served by radio access network node 105B. At act 7, source radio access network node 105A may transmit to target radio access network node 105B pending sidelink traffic indication 240, or information contained therein, via payload information update message 250. Payload information update message 250 may be transmitted via backhaul links.

Responsive to receiving payload information update message 250, target radio access network node 105B may request one or more packets, or packets of one or more packet groups, indicated in pending sidelink traffic indication 240, from a user plane function ("UPF") entity of core network 130. In an embodiment, source radio access network node 105A may transfer actual packets corresponding to packet sequence numbers identified, or indicated, in pending sidelink traffic indication 240 toward target RAN node 105B. Accordingly, by relay user equipment 115B generating and transmitting pending sidelink traffic indication 240 to source radio access network node 105A, packets of traffic 205 that may have been otherwise lost due to remote user equipment 115A being handed over from source radio access network node 105A to target radio access network node 105B may be delivered to the remote user equipment by the target radio access network node.

Figure 3A:
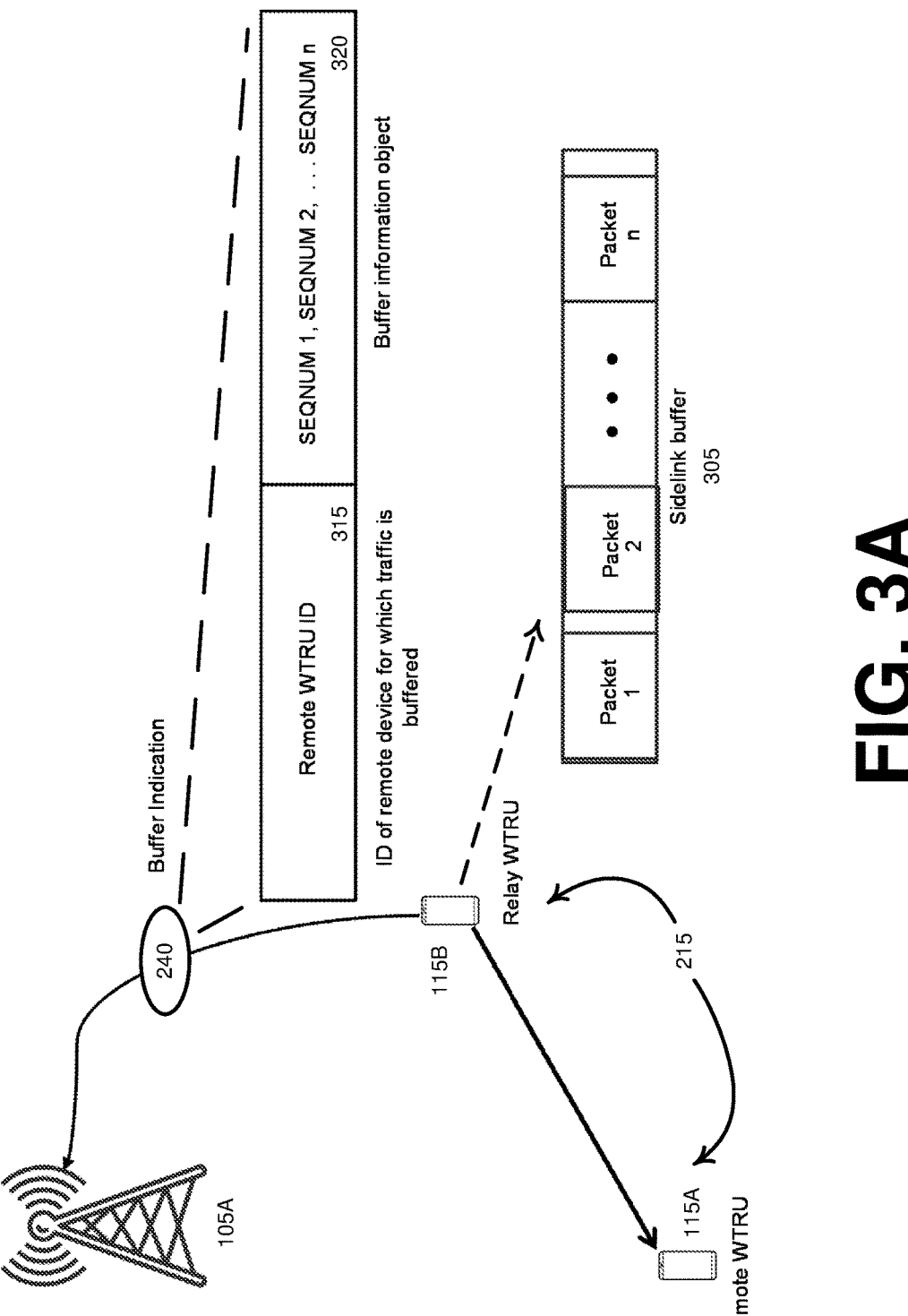
FIG. 3A illustrates an example pending sidelink traffic indication indicative of packets buffered by a relay user equipment.

Turning now to FIG. 3A, the figure illustrates environment 300 with relay UE/WTRU 115B and remote UE/WTRU 115A making up sidelink path 215. In the example shown in FIG. 3A, buffer 305 of relay UE 115B contains undelivered packet 1-packet n that have been received from source RAN 105A to be delivered to remote UE 115A. Relay UE 115B generates, and transmits to source RAN node 105A, pending sidelink traffic indication 240 that comprises remote user equipment identifier field 315 containing an identifier corresponding to remote UE 115A. Pending sidelink traffic indication 240 may comprise buffer information object 320 comprising a listing of sequence numbers SEQNUM 1-SEQNUM n corresponding, respectively, to undelivered packets 1-*n* contained in buffer 305 and associated with an identifier corresponding to UE 115A in identifier field 315.

Figure 3B:
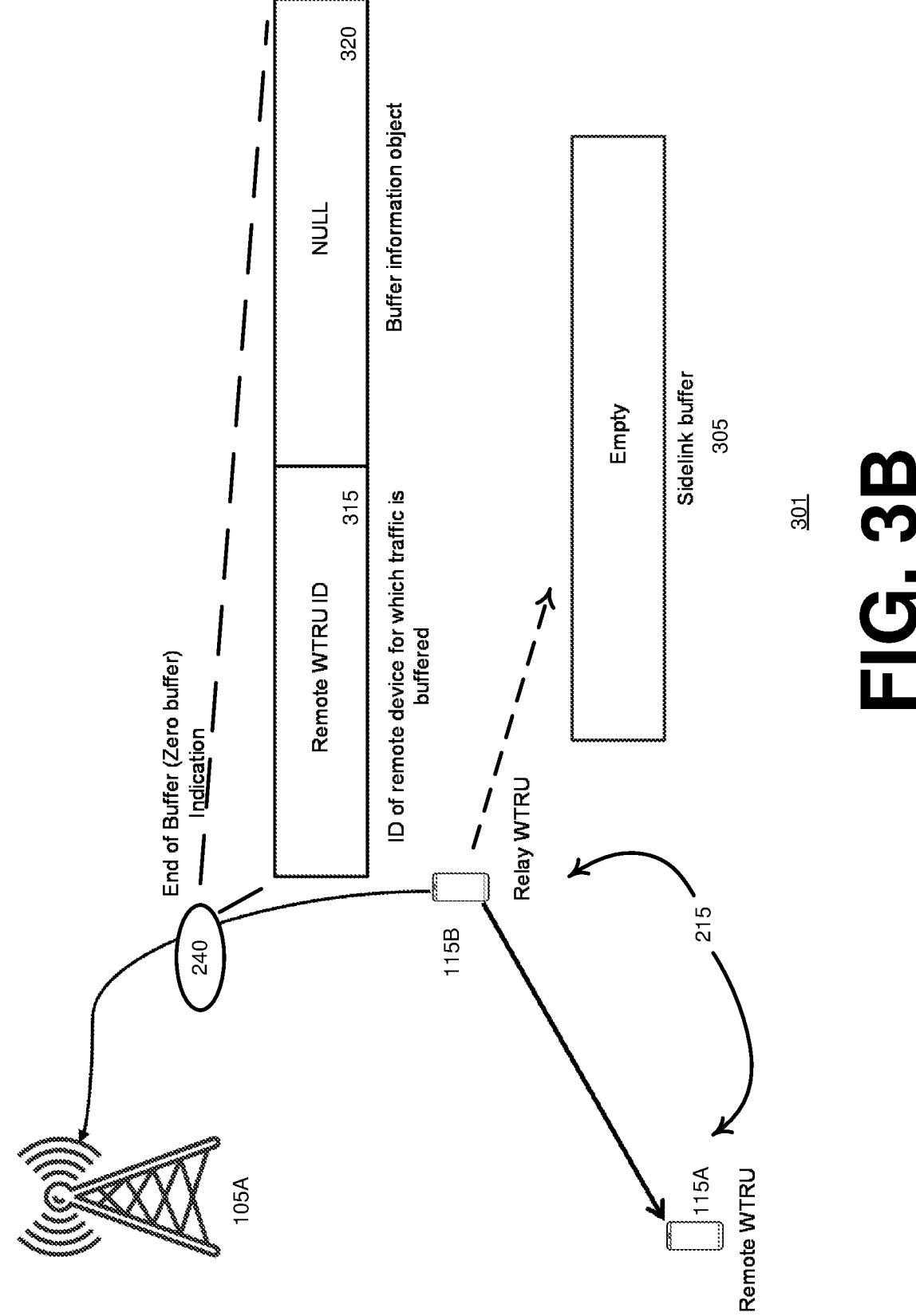
FIG. 3B illustrates an example pending sidelink traffic indication with null pending sidelink traffic information.

A shown in FIG. 3B, buffer 305 does not contain undelivered packets that were directed to remote UE 115A. Thus, pending sidelink traffic indication 240 contains a NULL indication in buffer information object 320 associated with an identifier corresponding to UE 115A in remote user equipment identifier field 315. In a scenario in which all traffic received at the sidelink relay user equipment 115B that is directed to remote user equipment 115A has been relayed and delivered to the remote user equipment device via a sidelink interface before receiving, by user equipment 115B, a path switching request, sidelink relay user equipment 115B may compile pending sidelink traffic indication 240, indicating the remote device identifier corresponding to remote user equipment 115A, and indicating a zero indication for the buffer size of buffer 305, (e.g., NULL or implicit indication for zero-sized pending data in buffer 305).

Figure 4:
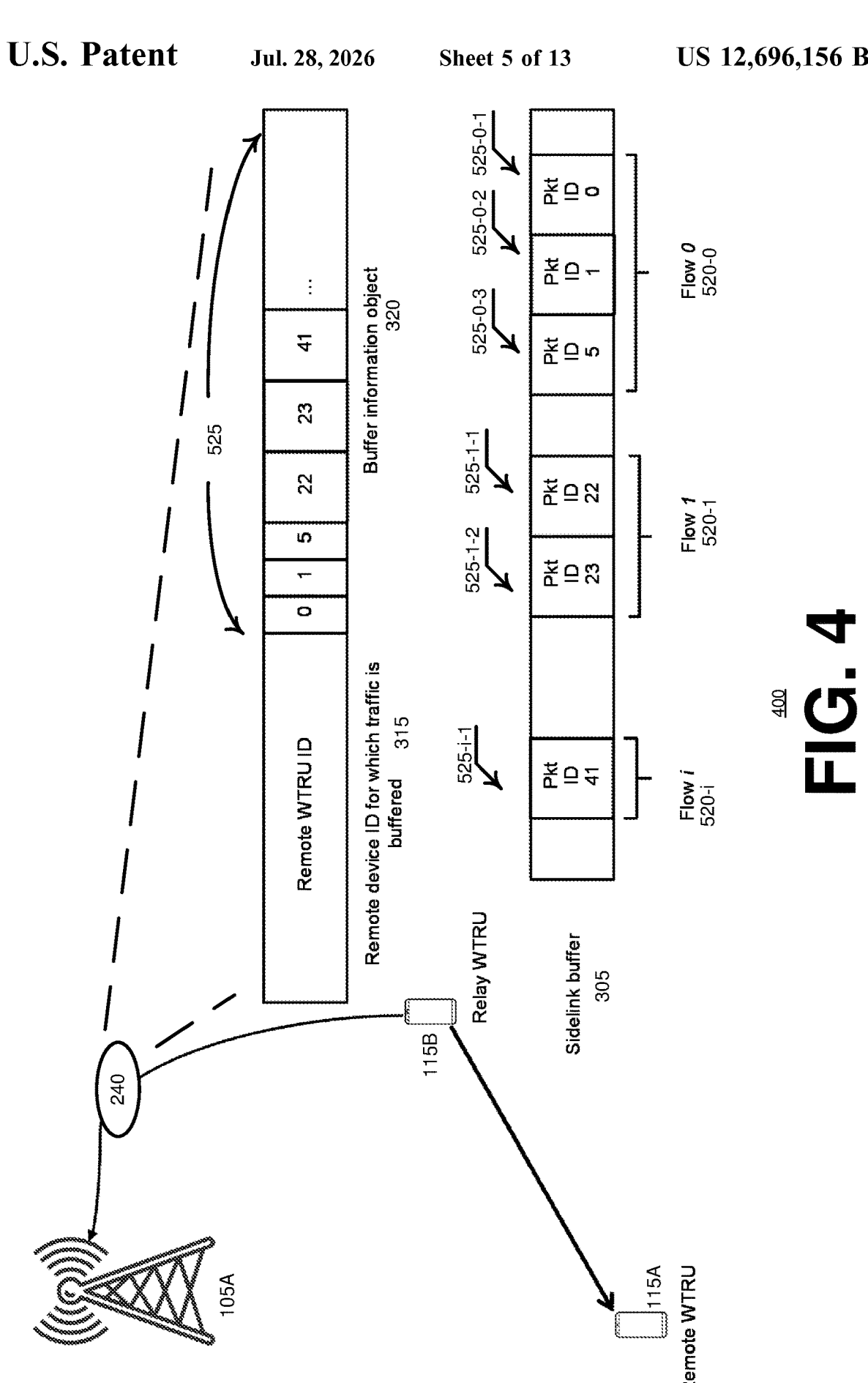
FIG. 4 illustrates an example pending sidelink traffic indication indicative of multiple traffic flows directed to a remote user equipment being facilitated by a relay user equipment.

Turning now to FIG. 4, the figure illustrates an example with pending packets in sidelink buffer 305 scheduled for relaying towards remote user equipment 115A via a sidelink interface after receiving a respective path switching request. Sidelink relay user equipment 115B may determine sequence numbers of buffered packet(s) or packet group sequence numbers, for pending traffic flows directed to remote user equipment 115A. Accordingly, relay user equipment 115B may compile a pending sidelink traffic indication 240, indicating an identifier corresponding to user equipment 115A in user equipment identifier field 315 and determined sequence numbers 525 of buffered packet(s) or packet sequence numbers in buffer information object 320. As shown in FIG. 4, multiple packets 525 associated with multiple different traffic flows 520, directed to remote user equipment 115A, may be indicated in pending sidelink traffic indication 240.

Figure 5:
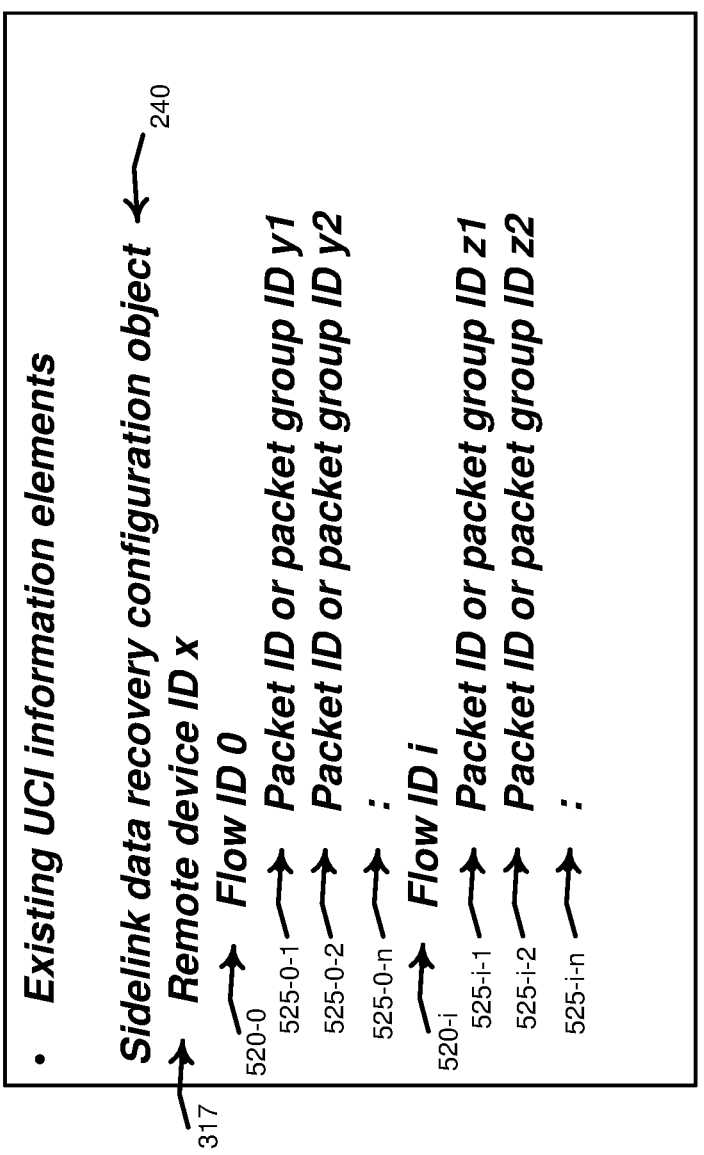
FIG. 5 illustrates an example pending sidelink traffic indication message.

Turning now to FIG. 5, the figure illustrates an uplink control information message 500 that may comprise example pending sidelink traffic information in a pending sidelink traffic indication 240. Uplink control information ("UCI") message 500 may be transmitted via an uplink control channel resource configured to be used by a relay user equipment, such as, for example, relay user equipment 115B described in reference to FIGS. 2-4. Pending sidelink traffic information contained in a pending sidelink traffic indication 240 may comprise a remote device identifier 317, which may be included in device identifier field 315 as described in reference to FIGS. 3A, 3B, and 4, associated with a remote user equipment to which pending sidelink traffic indication 240 corresponds. In a case of buffered traffic corresponding to multiple traffic flows, flow identifiers 520 associated with the traffic flows may be included in pending sidelink traffic indication 240 to facilitate possible retransmission of undelivered packets that may have the same sequence numbers 525 but that are associated with different traffic flows. Thus, as shown in FIG. 5, sequence numbers 525 may be arranged according to flow identifiers (e.g., packet identifiers 525-0-x correspond to flow identifier 520-0).

At act 2, user equipment 115A may move in direction 225 away from signal coverage range, or signal strength range, 210 corresponding to radio access network node 105A. At act 3, radio access network node 105A may determine that user equipment 115A should be handed over from being served by radio access network node 105A to being served by radio access network node 105B. The determination that remote user equipment 115A should be handed over from being served by source radio access network node 105A to target radio access network node 105B may be facilitated by relay user equipment 115B or by remote user equipment 115A. Accordingly, remote user equipment 115A may establish a communication connection, for example an RRC connected state communication session, with target radio access network node 105B at act 4. At act 5, relay user equipment 115B may receive a sidelink path switch request indication 230. Receiving of a sidelink path switch request indication 230 is shown in FIG. 2 with dashed lines to indicate that a sidelink path switch request indication may be generated by, and received from, remote user equipment 115A or radio access network node 105A.

Turning now to FIG. 6, the figure illustrates a timing diagram of an example embodiment method 600. At act 605, sidelink relay WTRU 115B may receive downlink traffic 205 from source RAN node 105A wherein the traffic is directed to active remote sidelink UE/WTRU 115A, and UE 115B may forward the received payload towards the destination remote sidelink UE/WTRU at act 610.

At act 615, relay UE 115B may receive a path switch request, either from remote WTRU via a sidelink interface or from source RAN node 105A via a 5G Uu interface. Based on receiving a path switch request at act 615, at act 620 sidelink relay UE/WTRU 115B may determine a packet size and sequence number set, corresponding to undelivered packets of traffic being forwarded towards the remote sidelink WTRU via a sidelink interface between UE 115B and UE 115A. On condition of no pending buffered payload for forwarding towards the sidelink remote WTRU, sidelink relay WTRU/UE 115B may transmit, at act 625, an end-of-buffer indication message in a pending sidelink traffic indication 240 directed to source RAN node 105A, indicating to the source RAN node a zero pending buffer size corresponding to an identifier indicated in the pending sidelink traffic indication associated with remote UE 115A (e.g., all buffered payload towards remote UE 115A device has been delivered before UE 115B received the path switch request at act 615). On condition of a non-zero sized pending buffered payload for forwarding towards the remote device, sidelink relay WTRU/UE 115B may transmit, towards the source RAN node in a pending sidelink traffic indication 240, pending payload information in terms of a set of packet or packet group sequence identifiers corresponding to the buffered traffic for each buffered traffic flow, associated with remote device identifier(s) indicted in the pending sidelink traffic indication 240, with respect to which the path switch request corresponds.

Figure 7:
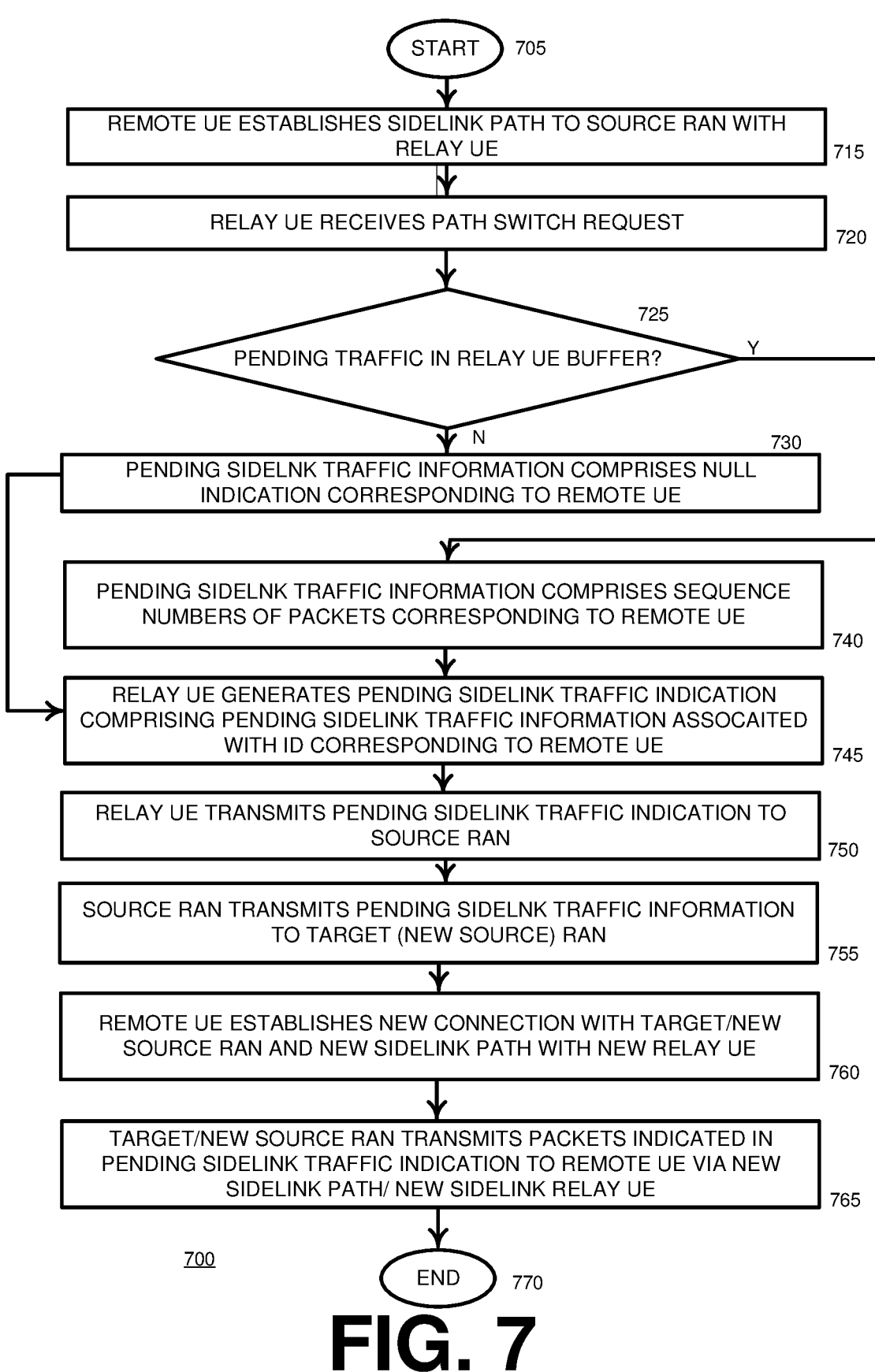
FIG. 7 illustrates a flow diagram of an example method to notify a source radio access network node of packets undelivered to a remote user equipment that is being handed over to a target radio access network node.

Turning now to FIG. 7, the figure illustrates a flow diagram of an example method 700. Method 700 begins at act 705. At act 715, a remote user equipment establishes a sidelink path to a source radio access network with at least one relay user equipment. The remote user equipment and the relay user equipment may comprise a side link path, or a side link route. The remote user equipment may have an existing communication session with the source radio access network node, for example a communication session established by exchanging radio resource control signals and messages between the remote user equipment and the source radio access network node. However, remote user equipment may be located where direct communication with the source radio access network node via a long-range wireless communication link may provide sub optimal performance or very poor performance. Thus, although the remote user equipment may have a currently-established communication session with the source radio access network node, the sidelink path that comprises the at least one relay user equipment may provide better communication performance between the remote user equipment and the source radio access network node than direct communication between the source radio access network node and the remote user equipment via a long-rang wireless link.

At act 720, the relay user equipment may receive a path switch request, for example path switch request message 230 described in reference to FIG. 2. In an embodiment, the path switch request may be received by the relay user equipment from the remote user equipment. In an embodiment, the path switch request may be received by the relay user equipment from the source radio access network node. At act 725, the relay user equipment may make a determination whether traffic payload (e.g., traffic packets) directed to the remote user equipment, the delivery of which traffic is facilitated by the relay user equipment, is buffered, or stored, in a buffer of the relay user equipment. Traffic packets buffered by the relay user equipment that have not been forwarded by, or relayed by, the relay user equipment to the remote user equipment may be referred to as undelivered traffic packets. If the determination made at act 725 is that the relay user equipment does not have traffic packets directed to the remote user equipment buffered at the relay user equipment, at act 730 the relay user equipment may generate, or determine, pending side link traffic information that comprises a null indication indicating that the relay user equipment does not have undelivered traffic packets directed to the remote user equipment buffered at the relay user equipment. Returning to description of act 725, if a determination is made that the relay user equipment has traffic packets that are directed to the remote user equipment that are buffered by the relay user equipment and that have not been forwarded or relayed to the remote user equipment, at act 740 the relay user equipment may generate, or determine, pending sidelink traffic information that may comprise sequence numbers or packet group sequence numbers corresponding to packets of the undelivered buffered traffic packets. Accordingly, pending sidelink traffic information generated at act 740 may be indicative of traffic packets buffered by the relay user equipment that have not been forwarded, relayed, or delivered to the remote user equipment.

At act 745, the relay user equipment may generate, or determine, a pending sidelink traffic indication comprising sidelink traffic information that may be associated in the pending sidelink traffic indication with a user equipment identifier corresponding to the remote user equipment. At act 750, the relay user equipment may transmit the pending sidelink traffic indication determined at act 745 to the source radio access network node. Accordingly, by transmitting a pending side link traffic indication to the source radio access network node the relay user equipment transmits an indication, or report, corresponding to traffic buffered, or stored, in a buffer of the relay user equipment that is associated with a user equipment (e.g., the remote user equipment) other than the relay user equipment.

At act 755, the source radio access network node may transmit pending sidelink traffic information received from the relay user equipment in the pending sidelink traffic indication to a target radio access network node, which may have been determined to be a new source radio access network node to serve the remote user equipment based on a signal strength corresponding to the target radio access network node being better, or stronger, with respect to the remote user equipment than a signal strength corresponding to the current source radio access network node. To transmit the pending sidelink traffic information transmitted at act 755, the source radio access network node may forward the pending side link traffic indication transmitted by the relay user equipment to the source radio access network node at act 750, or the source radio access network node may extract the pending sidelink traffic information from the pending sidelink traffic indication transmitted by relay user equipment in the pending sidelink traffic indication and transit the pending sidelink traffic information to the target/new source radio access network node.

At act 760, the remote user equipment, having moved to a location where signal strength, or signal coverage, with respect to the target radio access network node is better than a signal strength corresponding to the current source radio access network node, may establish a new connection with the target radio access network node via radio resource control signals and messaging and the remote user equipment may establish a new sidelink path with a new relay user equipment that is currently being served by the target radio access network node. The target radio access network node may be referred to as a new source radio access network node since the remote user equipment has established a new communication session with the target/new source radio access network node. The new communication session may be referred to as a second communication session and the previous communication session with the previous/old source radio access network node may be referred to as a first communication session.

Having received the pending side link traffic information from the old source radio access network node, the new source radio access network node may request undelivered packets corresponding to sequence numbers indicated by the pending side link traffic information for transmission to the remote user equipment. The new source radio access network node may receive requested undelivered packets from a core network entity or from the old source radio access network node. At act 765, the target/new source radio access network node may transmit the packets, corresponding to sequence numbers indicated in the pending cycling traffic indication that were undelivered by the old source radio access network node, to the remote user equipment. The previously undelivered packets indicated by the pending side link traffic indication may be transmitted directly by the new source radio access network node to the remote user equipment via a long-range wireless communication link or via a new sidelink communication path between the new source radio access network node and the remote user equipment that may have been established at act 760. Method 700 advances to act 770 and ends.

Turning now to FIG. 8, the figure illustrates an example embodiment method 800 comprising at block 805 receiving, by a first user equipment comprising a processor from a second user equipment, a sidelink path switch request indication indicative that the second user equipment is to be handed over from being served by a first radio access network node to being served by a second radio access network node; at block 810 responsive to receiving the sidelink path switch request indication, generating, by the first user equipment, a pending sidelink traffic indication indicative of at least one traffic flow corresponding to the second user equipment, wherein the first user equipment is configured to facilitate delivery of the at least one traffic flow to the second user equipment; at block 815 transmitting, by the first user equipment to the first radio access network node, the pending sidelink traffic indication; at block 820 wherein the at least one traffic flow comprises at least one packet to be transmitted by the first user equipment to the second user equipment, and wherein the pending sidelink traffic indication comprises at least one sequence number corresponding to the at least one packet; and at block 825 wherein the pending sidelink traffic indication comprises a remote user equipment identifier, corresponding to the second user equipment, indicative that the at least one packet is to be transmitted to the second user equipment.

Turning now to FIG. 9, the figure illustrates an example first user equipment 900 comprising at block 905 a processor configured to transmit, to a second user equipment, a path switch request, indicative that the first user equipment is to be handed over from a first radio access network node to a second radio access network node, wherein the first user equipment and the second user equipment have an established first connection with the first radio access network node, and wherein the first user equipment and the second user equipment are part of a first sidelink path that comprises a first sidelink communication link between the first user equipment and the second user equipment; at block 910 establish a second connection with the second radio access network node; at block 915 receive a least one packet corresponding to a traffic flow that is associated with the first user equipment and that is directed by the second radio access network node to the first user equipment, wherein the at least one packet is stored by the second user equipment and is undelivered by the second user equipment to the first user equipment, wherein the second radio access network node directs the at least one packet to the first user equipment according to pending sidelink traffic information that is indicative of the at least one packet, and wherein the pending sidelink traffic information is transmitted via a pending sidelink traffic indication by the second user equipment to the first radio access network node; at block 920 wherein the processor is further configured to determine a third user equipment, that is in a connected state with respect to the second radio access network node, with which to establish a second sidelink path; and at block 925 wherein the second sidelink path comprises a second sidelink communication link between the first user equipment and the third user equipment, and wherein the at least one packet is directed to the first user equipment via the second sidelink communication link.

Turning now to FIG. 10, the figure illustrates a non-transitory machine-readable medium 1000 comprising at block 1005 executable instructions that, when executed by a processor of a relay user equipment, facilitate performance of operations, comprising: receiving, from a remote user equipment, a sidelink path switch request indication indicative that the remote user equipment is to be switched from being served by a source radio access network node to being served by a target radio access network node; at block 1010 responsive to receiving the sidelink path switch request indication, generating a pending sidelink traffic indication indicative of at least one traffic flow, corresponding to the remote user equipment, wherein the relay user equipment is configured to facilitate delivery of the at least one traffic flow to the remote user equipment via a first sidelink path comprising the relay user equipment and the remote user equipment; at block 1015 transmitting, to the source radio access network node, the pending sidelink traffic indication; at block 1020 wherein the pending sidelink traffic indication comprises a remote device identifier, corresponding to the remote user equipment, indicative that at least one packet corresponding to the at least one traffic flow is to be transmitted to the remote user equipment; at block 1025 wherein the pending sidelink traffic indication comprises at least one sequence identifier, corresponding to at least one packet of the at least one traffic flow, that is undelivered by the relay user equipment to the remote user equipment; and at block 1030 wherein the pending sidelink traffic indication comprises at least one flow identifier corresponding to the at least one traffic flow.

Figure 12:
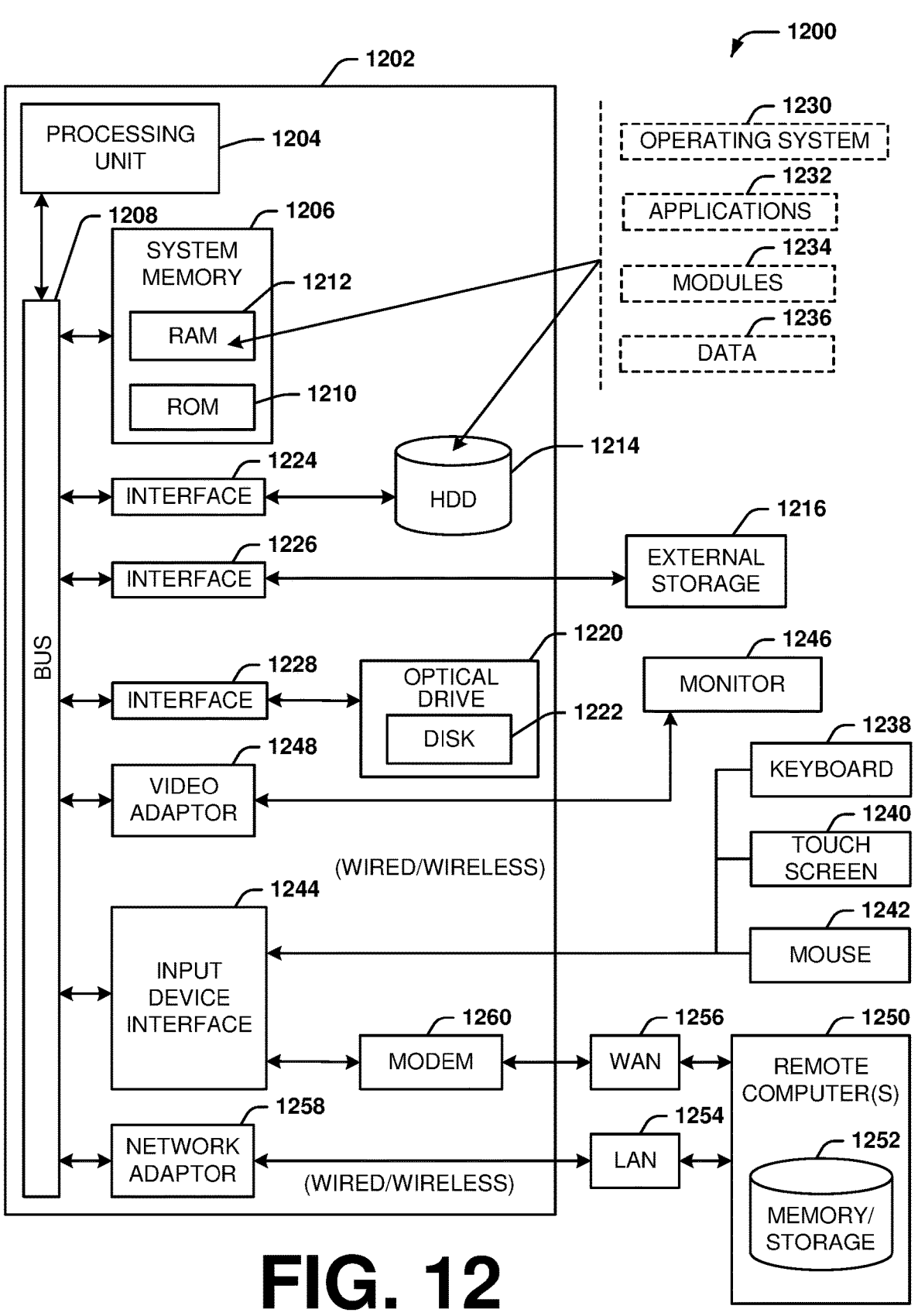
FIG. 12 illustrates an example computer environment.

In order to provide additional context for various embodiments described herein, FIG. 12 and the following discussion are intended to provide a brief, general description of a suitable computing environment 1200 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and nonremovable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors and may include a cache memory. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

Computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid-state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can comprise a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
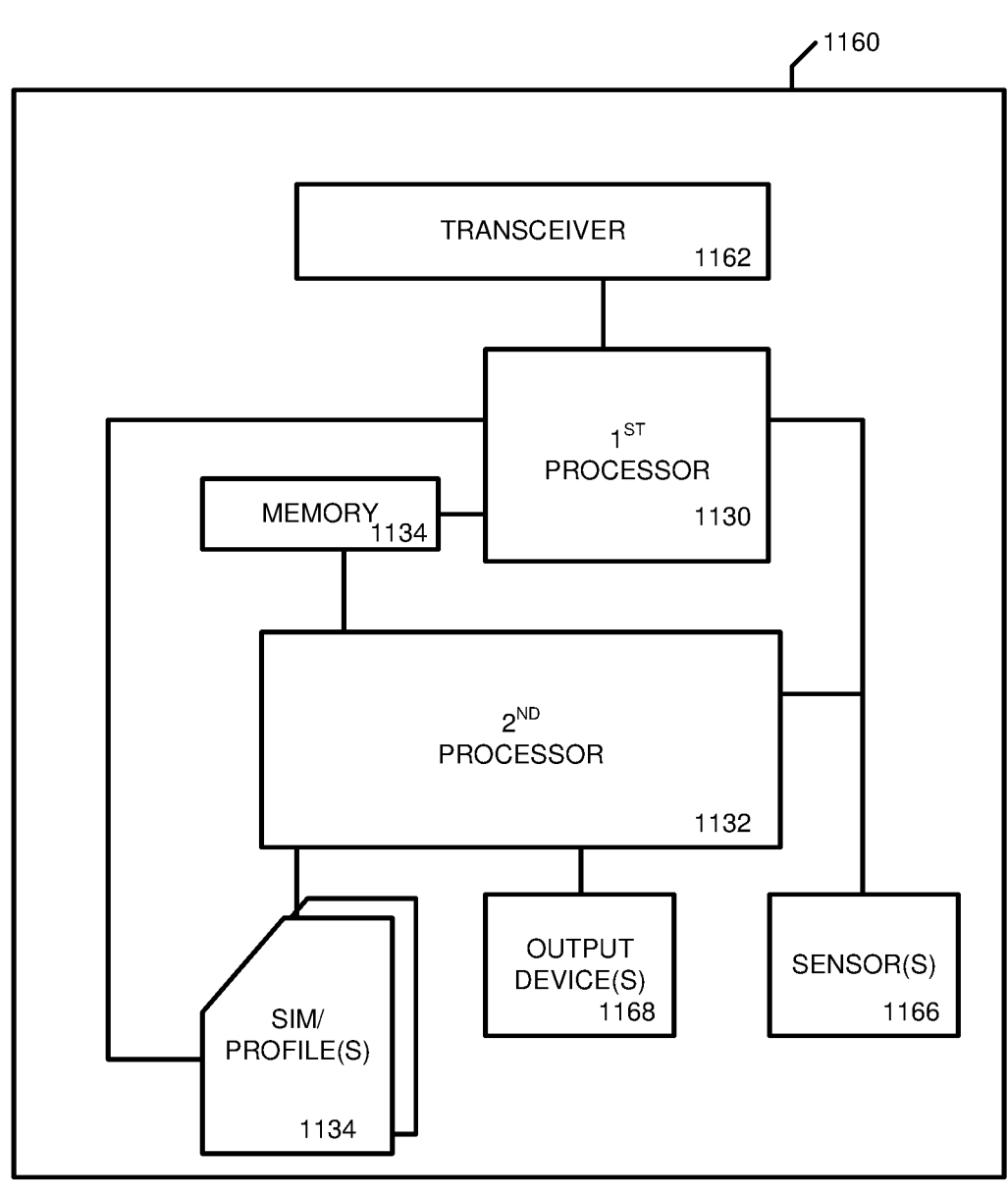
FIG. 11 illustrates a block diagram of an example wireless UE.

Turning now to FIG. 11, the figure illustrates a block diagram of an example UE 1160. UE 1160 may comprise a smart phone, a wireless tablet, a laptop computer with wireless capability, a wearable device, a machine device that may facilitate vehicle telematics, and the like. UE 1160 comprises a first processor 1130, a second processor 1132, and a shared memory 1134. UE 1160 includes radio front end circuitry 1162, which may be referred to herein as a transceiver, but is understood to typically include transceiver circuitry, separate filters, and separate antennas for facilitating transmission and receiving of signals over a wireless link, such as one or more wireless links 125, 135, or 137 shown in FIG. 1. Furthermore, transceiver 1162 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 11, UE 1160 may also include a SIM 1164, or a SIM profile, which may comprise information stored in a memory (memory 34 or a separate memory portion), for facilitating wireless communication with RAN 105 or core network 110 shown in FIG. 1. FIG. 11 shows SIM 1164 as a single component in the shape of a conventional SIM card, but it will be appreciated that SIM 1164 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1164 and another device, which may be a component of RAN 105 or core network 130 shown in FIG. 1). A SIM profile 1164 may also comprise identifying information that is unique to the SIM, or SIM profile, such as, for example, an International Mobile Subscriber Identity ("IMSI") or information that may make up an IMSI.

SIM 1164 is shown coupled to both the first processor portion 1130 and the second processor portion 1132. Such an implementation may provide an advantage that first processor portion 30 may not need to request or receive information or data from SIM 1164 that second processor 1132 may request, thus eliminating the use of the first processor acting as a 'go-between' when the second processor uses information from the SIM in performing its functions and in executing applications. First processor 1130, which may be a modem processor or baseband processor, is shown smaller than processor 1132, which may be a more sophisticated application processor, to visually indicate the relative levels of sophistication (i.e., processing capability and performance) and corresponding relative levels of operating power consumption levels between the two processor portions. Keeping the second processor portion 1132 asleep/inactive/ in a low power state when UE 1160 does not need it for executing applications and processing data related to an application provides an advantage of reducing power consumption when the UE only needs to use the first processor portion 1130 while in listening mode for monitoring routine configured bearer management and mobility management/ maintenance procedures, or for monitoring search spaces that the UE has been configured to monitor while the second processor portion remains inactive/asleep.

UE 1160 may also include sensors 1166, such as, for example, temperature sensors, accelerometers, gyroscopes, barometers, moisture sensors, and the like that may provide signals to the first processor 1130 or second processor 1132. Output devices 1168 may comprise, for example, one or more visual displays (e.g., computer monitors, VR appliances, and the like), acoustic transducers, such as speakers or microphones, vibration components, and the like. Output devices 1168 may comprise software that interfaces with output devices, for example, visual displays, speakers, microphones, touch sensation devices, smell or taste devices, and the like, which are external to UE 1160.

The following glossary of terms given in Table 1 may apply to one or more descriptions of embodiments disclosed herein.

TABLE 1

| Term | Definition |
|------|------------|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| URLLC | Ultra reliable and low latency communication |
| CBR | Channel busy ratio |

TABLE 1-continued

| Term | Definition |
| --- | --- |
| SCI | Sidelink control information |
| SBFD | Sub-band full duplex |
| CLI | Cross link interference |
| TDD | Time division duplexing |
| FDD | Frequency division duplexing |
| BS | Base-station |
| RS | Reference signal |
| CSI-RS | Channel state information reference signal |
| PTRS | Phase tracking reference signal |
| DMRS | Demodulation reference signal |
| BS | Base-station |
| gNB | General NodeB |
| PUCCH | Physical uplink control channel |
| PUSCH | Physical uplink shared channel |
| SRS | Sounding reference signal |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities.

Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a first user equipment comprising at least one processor from a second user equipment, a sidelink path switch request indication indicative that the second user equipment is to be handed over from being served by a first radio access network node to being served by a second radio access network node;

responsive to receiving the sidelink path switch request indication, generating, by the first user equipment, a pending sidelink traffic indication indicative of at least one traffic flow corresponding to the second user equipment, wherein the first user equipment is configured to facilitate delivery of the at least one traffic flow to the second user equipment, wherein the at least one traffic flow comprises at least one packet to be transmitted by the first user equipment to the second user equipment, wherein the pending sidelink traffic indication comprises at least one sequence number corresponding to the at least one packet, wherein the pending sidelink traffic indication comprises a remote user equipment identifier, corresponding to the second user equipment, indicative that the at least one packet is to be transmitted to the second user equipment, and wherein the first radio access network node is unaware of the remote user equipment identifier; and transmitting, by the first user equipment to the first radio access network node, the pending sidelink traffic indication.

2. The method of claim 1, wherein the first user equipment and the second user equipment compose a sidelink communication path, and wherein the first user equipment and the second user equipment are in a connected state with respect to the first radio access network node.

3. The method of claim 1, wherein the first user equipment and the second user equipment are configured to communicate as part of a sidelink communication path via a sidelink communication link, wherein the sidelink communication link becomes a degraded sidelink communication link that is unable to facilitate communication between the first user equipment and the second user equipment, and wherein the first user equipment is unable to transmit the at least one packet to the second user equipment via the degraded sidelink communication link.

4. The method of claim 1, wherein the pending sidelink traffic indication comprises a flow identifier corresponding to the at least one traffic flow associated with the second user equipment.

5. The method of claim 1, wherein the at least one traffic flow comprises at least one packet, and wherein the pending sidelink traffic indication comprises a null indication indicative that the at least one packet has been transmitted, by the first user equipment, to the second user equipment.

6. The method of claim 1, wherein the pending sidelink traffic indication is transmitted via an uplink control information message.

7. The method of claim 1, wherein the pending sidelink traffic indication is indicative of the at least one traffic flow comprising multiple traffic flows corresponding to the second user equipment.

8. The method of claim 7, wherein the pending sidelink traffic indication comprises at least one null indication indicative that at least one packet, corresponding to at least one of the multiple traffic flows, that has been received by the first user equipment for transmission to the second user equipment via a sidelink communication path has been transmitted to the second user equipment via the sidelink communication path.

9. The method of claim 1, wherein the pending sidelink traffic indication is transmitted after the second user equipment has been handed over from the first radio access network node to the second radio access network node.

10. A first user equipment, comprising:

at least one processor configured to:

transmit, to a second user equipment, a path switch request, indicative that the first user equipment is to be handed over from a first radio access network node to a second radio access network node, wherein the first user equipment and the second user equipment have an established first connection with the first radio access network node via the second user equipment, and wherein the first user equipment and the second user equipment are part of a first sidelink path that comprises a first sidelink communication link between the first user equipment and the second user equipment;

establish a second connection with the second radio access network node; and receive a least one packet corresponding to a traffic flow that is associated with the first user equipment and that is directed by the second radio access network node to the first user equipment, wherein the at least one packet is stored by the second user equipment and is undelivered by the second user equipment to the first user equipment, wherein the second radio access network node directs the at least one packet to the first user equipment according to pending sidelink traffic information that is indicative of the at least one packet, wherein the pending sidelink traffic information is transmitted via a pending sidelink traffic indication by the second user equipment to the first radio access network node, wherein the pending sidelink traffic indication comprises a remote user equipment identifier, corresponding to the first user equipment, indicative that the at least one packet is to be transmitted to the first user equipment, and wherein the first radio access network node is unaware of the remote user equipment identifier.

11. The first user equipment of claim 10, wherein the at least one processor is further configured to determine a third user equipment, that is in a connected state with respect to the second radio access network node, with which to establish a second sidelink path.

12. The first user equipment of claim 11, wherein the second sidelink path comprises a second sidelink communication link between the first user equipment and the third user equipment, and wherein the at least one packet is directed to the first user equipment via the second sidelink communication link.

13. The first user equipment of claim 10, wherein the at least one processor is further configured to:

determine a first signal strength corresponding to the first radio access network node to result in a determined first signal strength;

determine a second signal strength corresponding to the second radio access network node to result in a determined second signal strength;

analyze the determined first signal strength and the determined second signal strength with respect to a signal strength criterion to result in a first analyzed signal strength and a second analyzed signal strength, respectively; and determine the path switch request based on the first analyzed signal strength failing to satisfy the signal strength criterion and the second analyzed signal strength satisfying the signal strength criterion, wherein the second user equipment transmits the pending sidelink traffic information to the first radio access network node in response to receiving the path switch request.

14. The first user equipment of claim 10, wherein the pending sidelink traffic indication comprises a flow identifier corresponding to the traffic flow.

15. The first user equipment of claim 10, wherein the pending sidelink traffic indication is transmitted after the first user equipment has been handed over from the first radio access network node to the second radio access network node.

16. A non-transitory machine-readable medium, comprising executable instructions that, when executed by at least one processor of a relay user equipment, facilitate performance of operations, comprising:

receiving, from a remote user equipment, a sidelink path switch request indication indicative that the remote user equipment is to be switched from being served by a source radio access network node to being served by a target radio access network node;

responsive to receiving the sidelink path switch request indication, generating a pending sidelink traffic indication indicative of at least one traffic flow, corresponding to the remote user equipment, wherein the relay user equipment is configured to facilitate delivery of the at least one traffic flow to the remote user equipment via a first sidelink path comprising the relay user equipment and the remote user equipment; and transmitting, to the source radio access network node, the pending sidelink traffic indication, wherein the pending sidelink traffic indication comprises a remote device identifier, corresponding to the remote user equipment, indicative that the at least one packet is to be transmitted to the remote user equipment, and wherein the source radio access network node is unaware of the remote device identifier.

17. The non-transitory machine-readable medium of claim 16, wherein the pending sidelink traffic indication comprises at least one sequence identifier, corresponding to at least one packet of the at least one traffic flow, that is undelivered by the relay user equipment to the remote user equipment.

18. The non-transitory machine-readable medium of claim 16, wherein the pending sidelink traffic indication comprises at least one flow identifier corresponding to the at least one traffic flow.

19. The non-transitory machine-readable medium of claim 16, wherein the at least one traffic flow comprises at least one packet, and wherein the pending sidelink traffic indication comprises a null indication indicative that the at least one packet has been transmitted, by the relay user equipment, to the remote user equipment.

20. The non-transitory machine-readable medium of claim 16, wherein the pending sidelink traffic indication is transmitted after the remote user equipment has been handed over from the source radio access network node to the target radio access network node.

* * * * *